(12) United States Patent
Stenvik et al.

(10) Patent No.: US 10,046,919 B1
(45) Date of Patent: Aug. 14, 2018

(54) APPARATUS AND METHOD FOR SEPARATING FOOD PRODUCT FROM CONVEYOR BELT

(71) Applicant: General Mills, Inc., Minneapolis, MN (US)

(72) Inventors: Ralph A Stenvik, Plymouth, MN (US); Bryan M Dade, Minneapolis, MN (US); Molly Moen, Rosemount, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 15/691,270

(22) Filed: Aug. 30, 2017

(51) Int. Cl.
*B65G 45/14* (2006.01)
*B65G 15/28* (2006.01)

(52) U.S. Cl.
CPC ............. *B65G 45/14* (2013.01); *B65G 15/28* (2013.01)

(58) Field of Classification Search
CPC ......... B65G 45/10; B65G 45/12; B65G 45/14
USPC ........................................ 198/494, 497, 498
See application file for complete search history.

(56) References Cited

U.S. PATENT DOCUMENTS

| | | | | |
|---|---|---|---|---|
| 3,288,275 A | * | 11/1966 | Bunting | B65G 45/105 198/498 |
| 3,338,386 A | | 8/1967 | Riabouchinsky et al. | |
| 4,197,936 A | * | 4/1980 | Fowler | B65G 45/14 198/498 |
| 5,161,669 A | * | 11/1992 | Gibson, Jr. | B65G 45/12 198/499 |
| 7,353,934 B2 | * | 4/2008 | Brussel | B29C 31/08 198/494 |
| 8,528,724 B2 | * | 9/2013 | Dunnwald | B65G 45/16 198/499 |

FOREIGN PATENT DOCUMENTS

| | | | | |
|---|---|---|---|---|
| FR | 2264743 | * | 10/1975 | B65G 45/00 |
| FR | 2697514 | * | 5/1994 | B65G 45/14 |

* cited by examiner

*Primary Examiner* — James R Bidwell
(74) *Attorney, Agent, or Firm* — Diederiks & Whitelaw, PLC; Gregory P. Kaihoi, Esq.

(57) ABSTRACT

A food production apparatus includes a conveyor belt and a wire scraper. The conveyor belt supports and transports a food product. The wire scraper includes a wire and a motor. The wire is located above and extends across the conveyor belt to temporarily separate the food product from the conveyor belt. Operation of the motor causes the wire to continuously cycle back and forth between 1) movement in a first direction above and across the conveyor belt and 2) movement in a second opposite direction above and across the conveyor belt.

20 Claims, 5 Drawing Sheets

APPARATUS AND METHOD FOR SEPARATING FOOD PRODUCT FROM CONVEYOR BELT

BACKGROUND OF THE INVENTION

The present invention pertains to food production and, more particularly, to separating food products from upon a conveyor belt.

During food production, it is common for food products to be transported using a conveyor belt. Depending on the type of food product being produced and the point at which the food products are placed on the conveyor belt, the food products may tend to stick to the conveyor belt. One way to address this problem is to use a stationary wire located directly above the conveyor belt. As the food products travel along the conveyor belt, the food products pass over the wire. This temporarily separates the food products from the conveyor belt and is typically sufficient to prevent the food products from sticking to the conveyor belt. However, there are problems with this arrangement. Food product tends to build up on the wire. As the buildup increases, the wire is lifted from the conveyor belt, which causes the wire actually to cut through the food products traveling along the conveyor belt instead of separating the food products from the conveyor belt. Also, the wire is prone to breakage. This problem is exacerbated by the fact that the wire is not serviceable without production stoppage.

In view of the above, there is a need in the art for a way to separate food products from a conveyor belt while minimizing food product buildup on the separator and ensuring that the separator can be easily serviced, preferably without production stoppage.

SUMMARY OF THE INVENTION

To accomplish the above objectives, the present invention provides a wire scraper for separating food products from a conveyor belt where the wire is continuously oscillated as the food products pass over the wire. This oscillating motion prevents buildup of food product on the wire. In addition, the wire can be moved away from the conveyor belt so that the wire can be changed out while the food products continue traveling along the conveyor belt. Specifically, the wire is held by a frame, which is exchanged for another frame holding another wire.

In one embodiment of the present invention, a food production apparatus comprises a conveyor belt and a wire scraper. The conveyor belt is configured to support and transport a food product. The wire scraper includes a wire and a motor. The wire is located above and extends across the conveyor belt. The wire scraper is configured to temporarily separate the food product from the conveyor belt with the wire. Operation of the motor causes the wire to continuously cycle back and forth between 1) movement in a first direction above and across the conveyor belt and 2) movement in a second, opposite direction above and across the conveyor belt. Specifically, operation of the motor causes the wire to continuously move along an elliptical path.

The wire scraper further includes a frame configured to hold the wire. In particular, the wire has a first end directly coupled to the frame and a second, opposite end directly coupled to the frame. The wire scraper includes a pin and a first hole, and the frame includes a second hole. The pin is removably received in the first and second holes to removably couple the frame to the wire scraper. The wire scraper is also configured to selectively move the wire between an in-use position, where the food product passes over the wire, and a service position, where the food product passes under the wire.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention. In addition, any specific numerical value listed herein includes a margin of error of +/−5%. Accordingly, a length of 1.00 inch includes lengths between 0.950 and 1.05 inches. Similarly, a range of 0.800-1.20 inches includes lengths between 0.760 and 1.26 inches. The terms "horizontal" and "vertical" are defined as including a margin of error of +/−5° such that an object need not be perfectly horizontal, for example.

As discussed above, when producing food products, it is sometimes necessary to separate the food products from a conveyor belt on which the food products are traveling to prevent the food products from sticking to the conveyor belt. Although a stationary wire can be used for this purpose, there are downsides to this approach. Specifically, food product tends to build up on the wire, the wire is prone to breakage, and the wire is not serviceable without production stoppage. Accordingly, the present invention provides an oscillating wire that can be changed out while the food products continue traveling along the conveyor belt.

Figure 1:
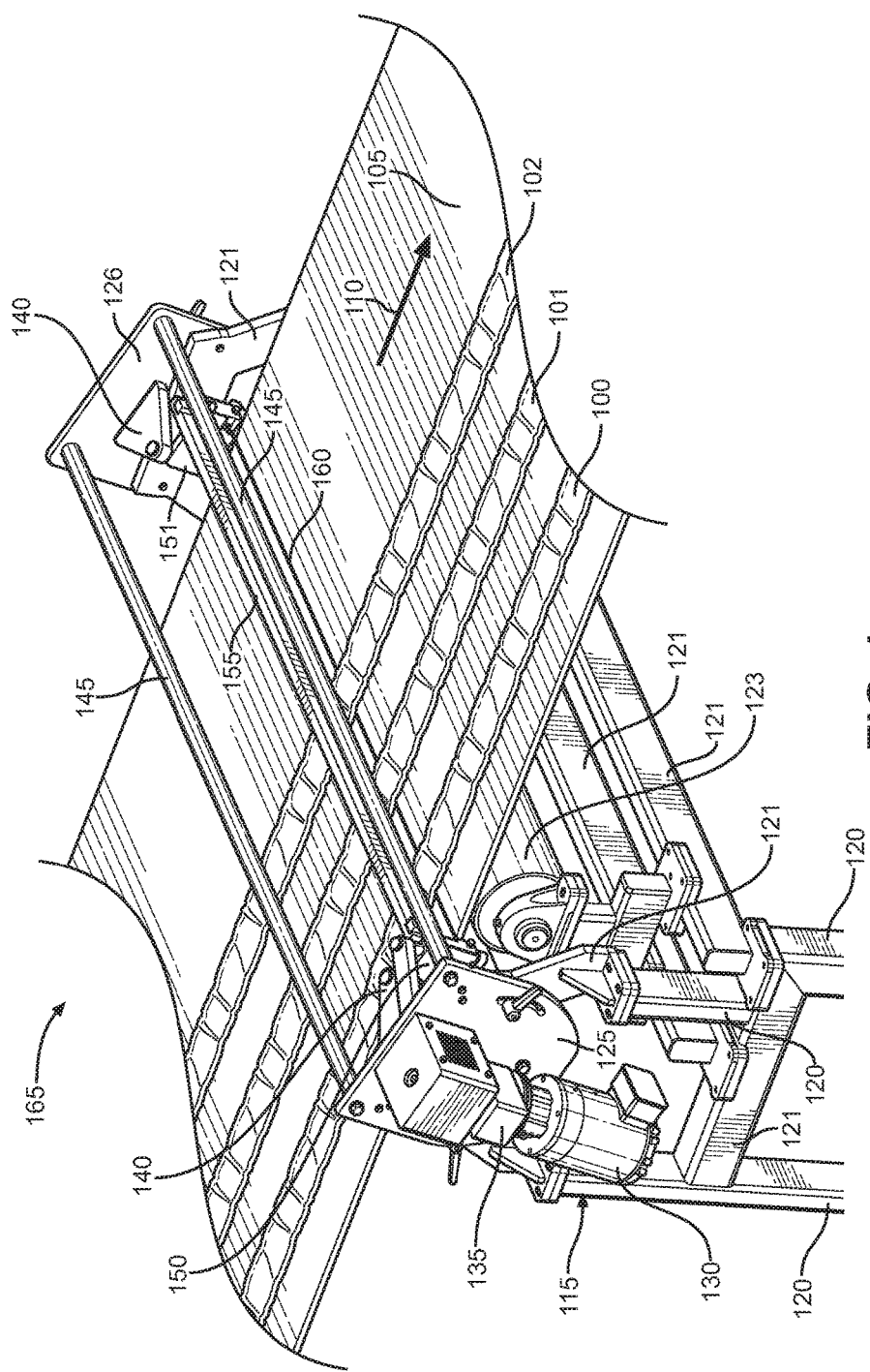
FIG. 1 is a perspective view of a wire scraper constructed in accordance with the present invention.

With initial reference to FIG. 1, there is shown a plurality of ropes 100-102 of a food product. Ropes 100-102 are supported on and being transported by a conveyor belt 105. In particular, ropes 100-102 are being transported in a direction 110. To prevent ropes 100-102 from sticking to conveyor belt 105, a wire scraper 115 is provided. Wire scraper 115 includes a plurality of vertical extending legs 120 supporting wire scraper 115 on a support surface. Wire scraper 115 also includes a plurality of horizontally extending supports 121 connecting the plurality of legs 120. A roller 123 supports conveyor belt 105 as conveyor belt 105 passes through wire scraper 115. Mounting plates 125 and 126 are pivotally coupled to corresponding supports 121 so that the structure mounted to mounting plates 125 and 126 can be selectively moved relative to the rest of wire scraper 115 (as well as conveyor belt 105). In particular, a motor 130 and a transmission 135 are mounted on the exterior side of mounting plate 125. A pair of brackets 140 is mounted on the interior side of each of mounting plates 125 and 126, although only the upper brackets 140 are visible. Supports 145 extend horizontally between mounting plates 125 and 126 to connect mounting plates 125 and 126 to one another. Also, a mounting plate or arm 150, 151 is pivotally coupled to each pair of brackets 140, and a frame 155 is removably coupled to mounting plates 150 and 151. As a result, frame 155 extends across the width of conveyor belt 105. Frame 155 holds a wire 160, which extends from one end of frame 155 to the other. Accordingly, wire 160 also extends across the width of conveyor belt 105. In addition, wire 160 is located above conveyor belt 105. Specifically, when wire scraper 115 is in an in-use position, as shown in FIG. 1, wire 160 is either located in contact with or just above conveyor belt 105. In this position, ropes 100-102 pass over wire 160 as ropes 100-102 travel along conveyor belt 105. This causes a portion of each rope 100-102 to become temporarily separated from conveyor belt 105, which helps prevent ropes 100-102 from sticking to conveyor belt 105. In one embodiment, wire 160 has a diameter of 0.025 inches (0.064 cm). To prevent the food product of ropes 100-102 from building up on wire 160, wire scraper 115 continuously moves wire 160 back and forth across conveyor belt 105. This motion is driven by motor 130, as will be discussed in more detail below.

Although not shown, it should be recognized that the food product was prepared upstream of wire scraper 115 and then extruded, for example, onto conveyor belt 105 to form ropes 100-102. Downstream of wire scraper 115, ropes 100-102 are cut to form a plurality of individual food products and then packaged. This upstream and downstream machinery, in combination with conveyor belt 105 and wire scraper 115, constitutes a food production apparatus 165.

Figure 2:
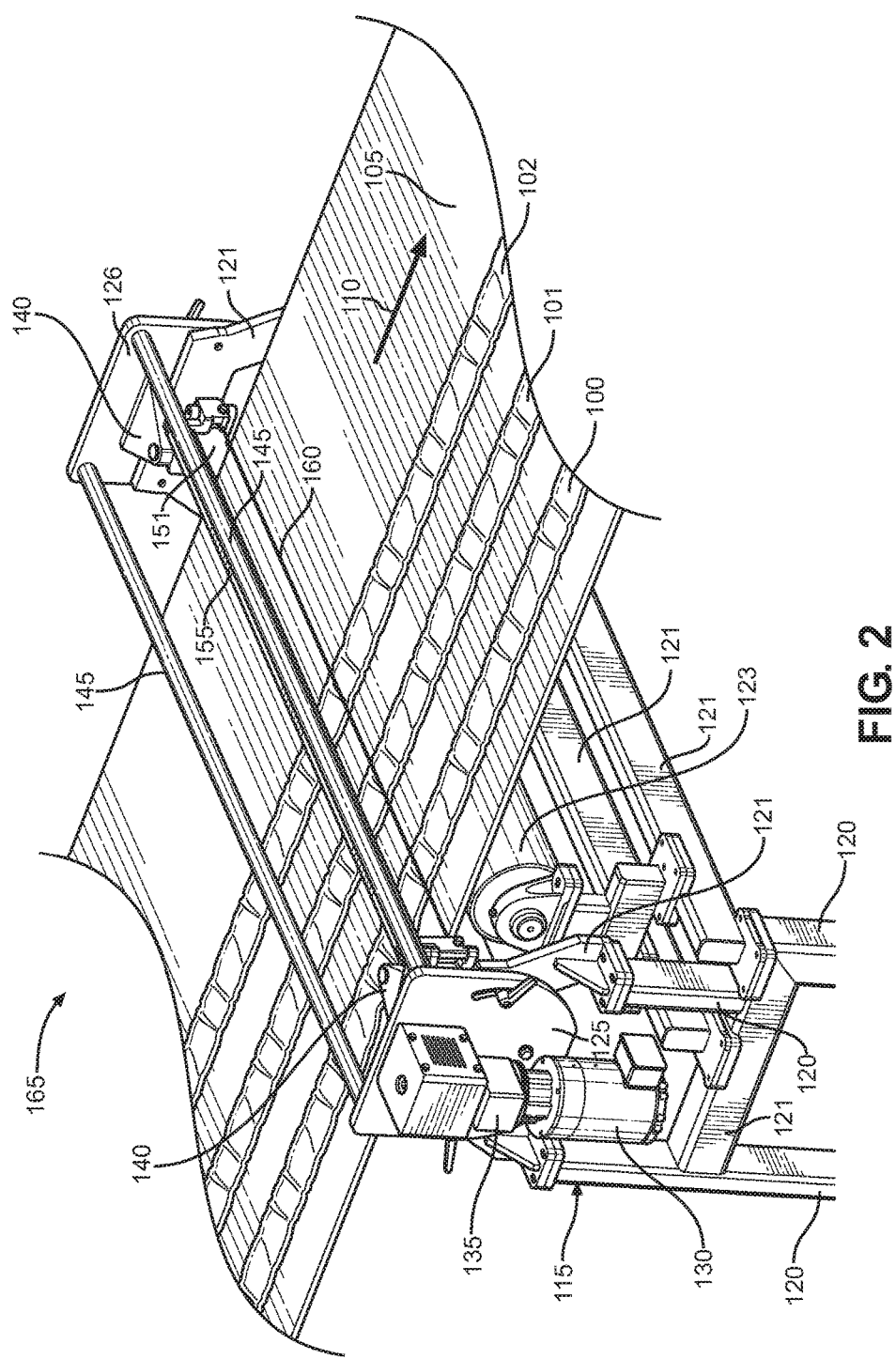
FIG. 2 shows the wire scraper in a service position.

With reference now to FIG. 2, wire scraper 115 is shown in a service position. To switch from the in-use position of FIG. 1 to the service position of FIG. 2, mounting plates 125 and 126 are pivoted relative to legs 120 and supports 121. This moves frame 155 and wire 160 relative to conveyor belt 105 such that wire 160 is now located above ropes 100-102. Accordingly, frame 155 can be exchanged for another frame holding another wire while ropes 100-102 continue traveling along conveyor belt 105. This allows wire 160 to be replaced without stopping production, which is useful if wire 160 breaks, for example. Of course, it should be recognized that ropes 100-102 will be cut by wire 160 when wire scraper 115 is switched between the in-use and service positions. Also, wire 160 obviously cannot separate ropes 100-102 from conveyor belt 105 while in the service position. Despite these downsides, it is preferred that conveyor belt 105 be able to move continuously during replacement of wire 160 so as not to interrupt the production processes performed upstream and downstream of wire scraper 115.

Figure 3:
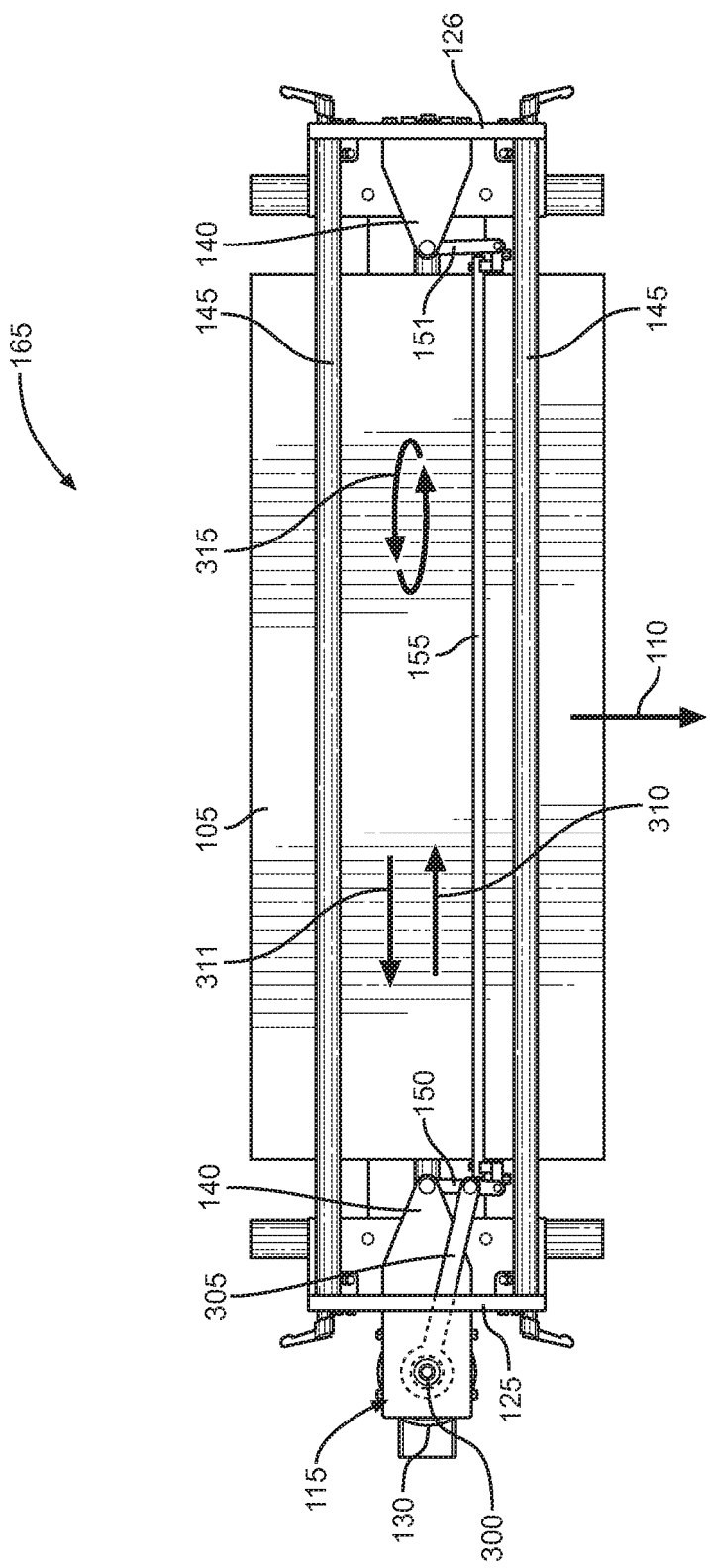
FIG. 3 is a top view of the wire scraper.

FIG. 3 provides a top view of wire scraper 115. This view helps highlight how operation of motor 130 causes movement of wire 160. Particularly, rotational motion generated by motor 130 is transmitted through transmission 135 (not visible here) to cause rotation of a camshaft 300. Rotation of camshaft 300 causes movement of a connecting link 305 that is coupled to camshaft 300. Connecting link 305 is also coupled to mounting plate 150, with movement of connecting link 305 causing mounting plate 150 to pivot. Since frame 155 is coupled to mounting plate 150, movement of connecting link 305 also causes movement of frame 155. Wire 160 is held by frame 155 and therefore moves along with frame 155. Camshaft 300 and connecting link 305 are configured so that wire 160 continuously cycles back and forth between 1) movement in a first direction 310 above and across conveyor belt 105 and 2) movement in a second opposite direction 311 above and across conveyor belt. Specifically, wire 160 continuously moves along an elliptical path 315 in a horizontal plane (i.e., a plane parallel to conveyor belt 105). Elliptical path 315 is exaggerated in FIG. 3 for illustration purposes. Wire 160 preferably only moves a small amount. For example, wire scraper 115 can be configured with a stroke length of 0.25 inches (0.64 cm) and a stroke rate of 550-600 strokes per minute.

Figure 4:
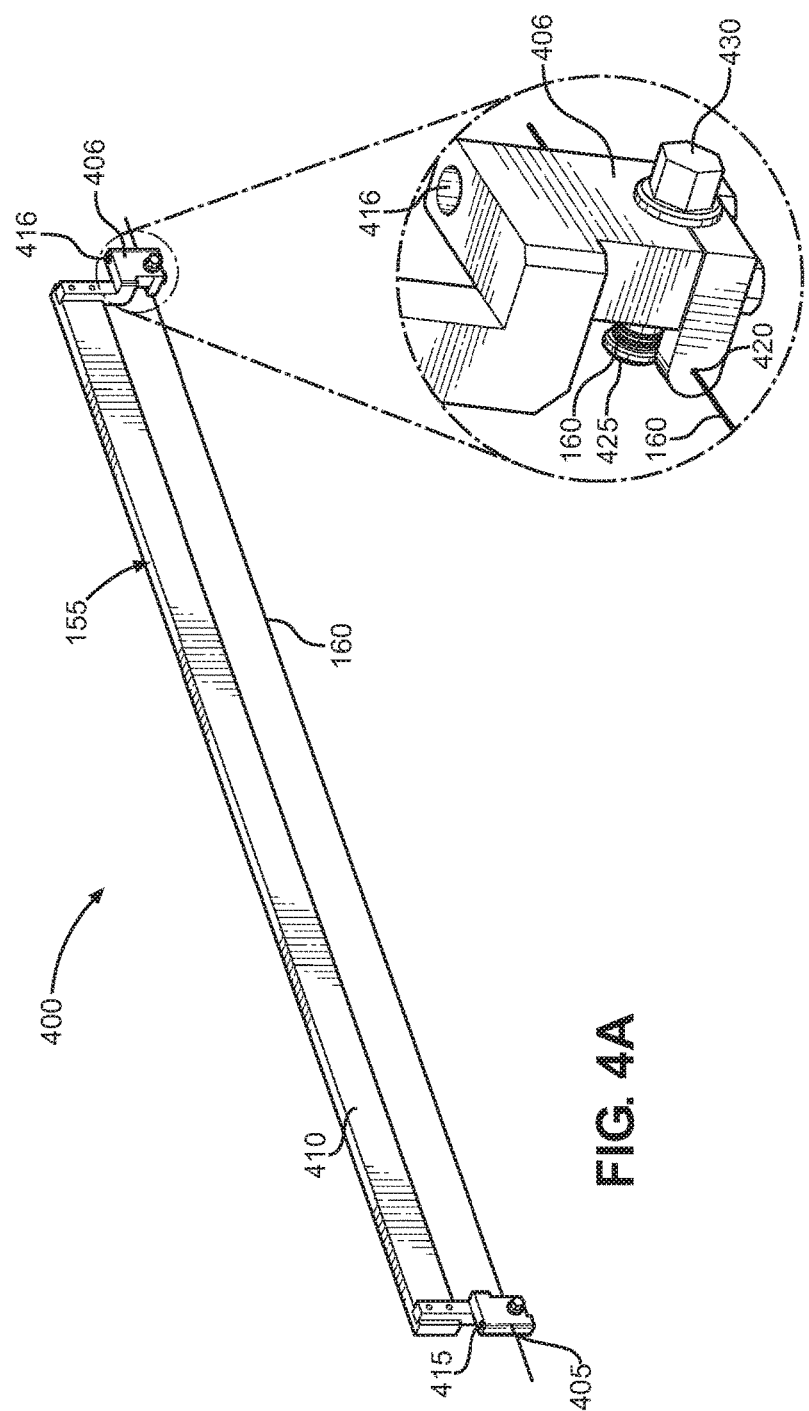
FIG. 4A is a perspective view of a harp of the wire scraper.
FIG. 4B is an enlarged view of a portion of the harp.

Turning to FIG. 4A, frame 155 and wire 160 are shown separate from the rest of wire scraper 115. Together frame 155 and wire 160 constitute a harp 400. Frame 155 includes two wire holders 405 and 406 connected by a support 410. In particular, wire holder 405 is located at a first end of frame 155 to hold a first end of wire 160, while wire holder 406 is located at a second opposite end of frame to hold a second opposite end of wire 160. Wire holders 405 and 406 include corresponding holes 415 and 416 for removably coupling frame 155 to the rest of wire scraper 115, as will be discussed in more detail below.

FIG. 4B shows wire holder 406 in more detail. Wire 160 passes through a hole 420 formed in wire holder 406 and is directly coupled to a spindle 425. The tension in wire 160 can be adjusted by rotating spindle 425. Specifically, as spindle 425 rotates in one direction, wire 160 is wrapped around spindle 425 to reduce the amount of wire 160 extending from wire holder 406 to wire holder 405 and to increase the tension of wire 160. To facilitate rotation of spindle 425, spindle 425 includes a hexagonal head 430 that can be rotated using a wrench or socket, for example.

Figure 5:
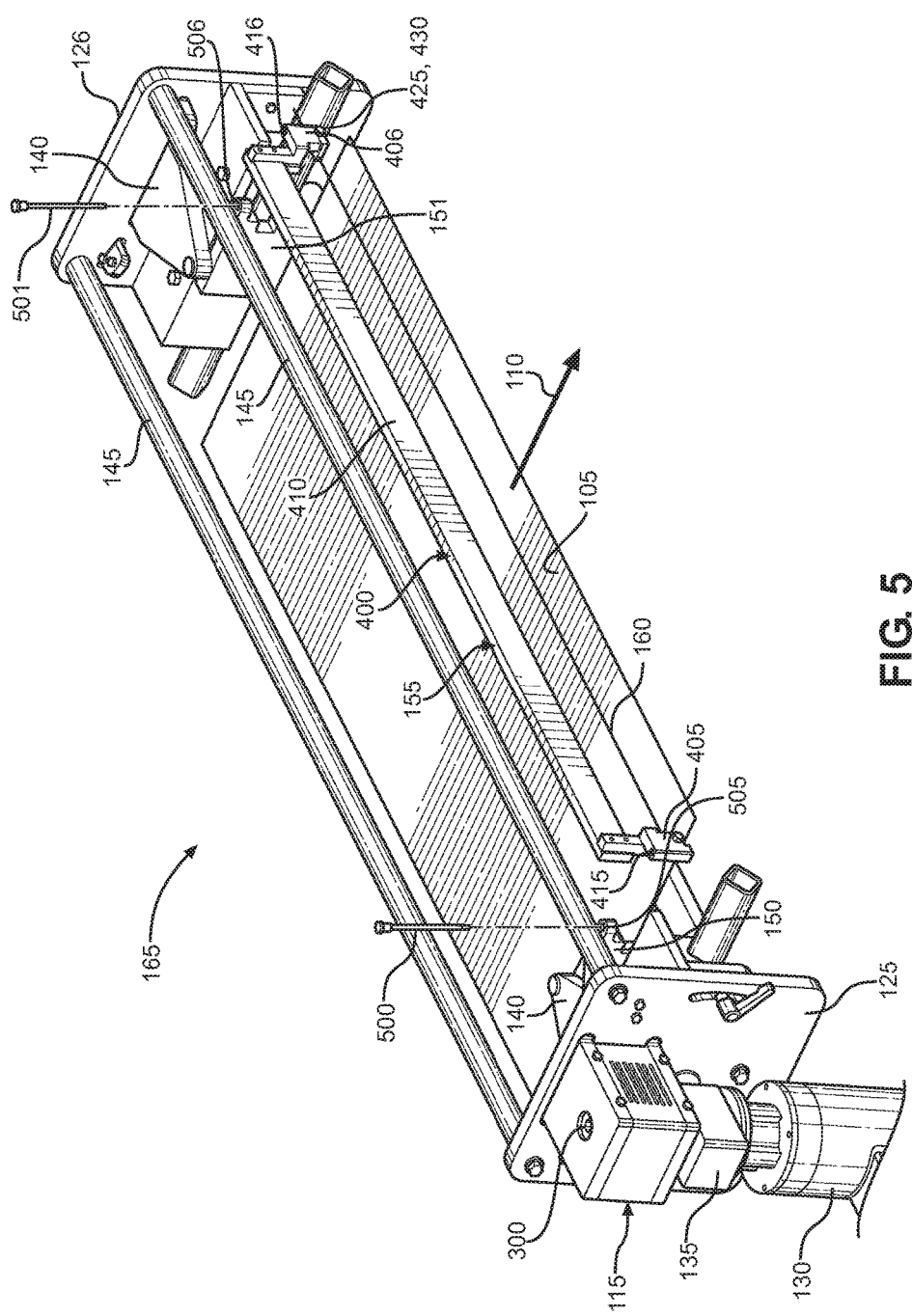
FIG. 5 shows the harp being removed from the wire scraper.

With reference now to FIG. 5, the removal of harp 400 is illustrated. Harp 400 is connected to the rest of wire scraper 115 using quick release pins 500 and 501. Quick release pins 500 and 501 respectively extend through holes 505 and 506 formed in mounting plates 150 and 151, through holes 415 and 416 formed in wire holders 405 and 406 and then through additional holes (not visible in FIG. 5 but clearly shown in FIG. 2) formed in mounting plates 150 and 151. Specifically, each of mounting plates 150 and 151 is bifurcated to provide spaced legs that receive quick release pins 500 and 501, as shown in FIGS. 2 and 5. When a user wishes to remove harp 400, quick release pins 500 and 501 are removed from holes 505, 506, 415 and 416 and the additional holes formed in mounting plates 150 and 151 by pulling quick release pins 500 and 501 upward. The user then slides harp 400 away from mounting plates 150 and 151 in direction 110. At this point, another harp can be coupled to wire scraper 115, and wire scraper 115 can be placed in the in-use position. Preferably, no tools are needed to remove quick release pins 500 and 501.

Based on the above, it should be readily apparent that the present invention provides a way to separate food products from a conveyor belt while minimizing food product buildup on the separator and ensuring that the separator can be easily serviced without production stoppage. While certain preferred embodiments of the present invention have been set forth, it should be understood that various changes or modifications could be made without departing from the spirit of the present invention. In general, the invention is only intended to be limited by the scope of the following claims.

The invention claimed is:

1. A food production apparatus comprising:
a conveyor belt configured to support and transport a food product; and
a wire scraper including:
a wire located above and extending across the conveyor belt, wherein the wire scraper is configured to temporarily separate the food product from the conveyor belt with the wire; and
a motor, wherein the wire scraper is configured such that operation of the motor causes the wire to continuously cycle back and forth in an operational path including 1) movement in a first direction above and across the conveyor belt and 2) movement in a second, opposite direction above and across the conveyor belt.

2. The food production apparatus of claim 1, wherein the wire scraper is configured such that the operational path is an elliptical path.

3. The food production apparatus of claim 1, wherein the wire scraper further includes a frame configured to hold the wire, and operation of the motor causes the frame to continuously cycle back and forth between 1) movement in a first direction above and across the conveyor belt and 2) movement in a second, opposite direction above and across the conveyor belt.

4. The food production apparatus of claim 3, wherein the wire scraper further includes a camshaft and a connecting link, operation of the motor causes rotation of the camshaft, rotation of the camshaft causes movement of the connecting link, and movement of the connecting link causes movement of the frame.

5. The food production apparatus of claim 3, wherein the wire has a first end directly coupled to the frame and a second, opposite end directly coupled to the frame.

6. The food production apparatus of claim 3, wherein the frame is removably coupled to the wire scraper.

7. The food production apparatus of claim 6, wherein the wire scraper further includes a pin and a first hole, the frame includes a second hole, and the pin is removably received in the first and second holes to removably couple the frame to the wire scraper.

8. The food production apparatus of claim 3, wherein the frame includes a spindle, the wire is directly coupled to the spindle, and the spindle is configured such that rotation of the spindle adjusts the tension of the wire.

9. The food production apparatus of claim 1, wherein the wire scraper is configured to selectively move the wire between an in-use position, where the food product passes over the wire, and a service position, where the food product passes under the wire.

10. The food production apparatus of claim 1, wherein the wire scraper further includes a roller configured to support the conveyor belt as the conveyor belt passes through the wire scraper.

11. A method of separating a food product from a conveyor belt, the method comprising:
supporting and transporting the food product upon the conveyor belt;
temporarily separating the food product from the conveyor belt with a wire of a wire scraper, wherein the wire is located above and extends across the conveyor belt; and
operating a motor of the wire scraper to cause the wire to continuously cycle back and forth in an operational path including 1) movement in a first direction above and across the conveyor belt and 2) movement in a second, opposite direction above and across the conveyor belt.

12. The method of claim 11, wherein the operational path is an elliptical path.

13. The method of claim 11, wherein the wire scraper further includes a frame configured to hold the wire, and operation of the motor causes the frame to continuously cycle back and forth between 1) movement in a first direction above and across the conveyor belt and 2) movement in a second, opposite direction above and across the conveyor belt.

14. The method of claim 13, wherein the wire scraper further includes a camshaft and a connecting link, operation of the motor causes rotation of the camshaft, rotation of the camshaft causes movement of the connecting link, and movement of the connecting link causes movement of the frame.

15. The method of claim 13, further comprising:
directly coupling a first end of the wire to the frame; and
directly coupling a second, opposite end of the wire to the frame.

16. The method of claim 13, further comprising removably coupling the frame to the wire scraper.

17. The method of claim 16, wherein removably coupling the frame to the wire scraper includes inserting a pin of the wire scraper into a first hole of the wire scraper and a second hole of the frame.

18. The method of claim 13, wherein the frame includes a spindle, and the wire is directly coupled to the spindle, the method further comprising adjusting the tension of the wire by rotating the spindle.

19. The method of claim 11, further comprising moving the wire from an in-use position, where the food product passes over the wire, to a service position, where the food product passes under the wire.

20. The method of claim 11, further comprising supporting the conveyor belt with a roller of the wire scraper as the conveyor belt passes through the wire scraper.

* * * * *